(12) United States Patent
Janssen

(10) Patent No.: US 6,914,654 B2
(45) Date of Patent: Jul. 5, 2005

(54) HIGH CONTRAST FAST LIQUID CRYSTAL DISPLAY SYSTEM

(75) Inventor: Peter J. Janssen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 64 days.

(21) Appl. No.: 10/052,994

(22) Filed: Nov. 9, 2001

(65) Prior Publication Data

US 2003/0090611 A1 May 15, 2003

(51) Int. Cl.$^7$ ............................................. G02F 1/1335
(52) U.S. Cl. ........................................ 349/117; 349/118
(58) Field of Search ..................... 349/137, 117, 349/118, 123, 127, 121

(56) References Cited

U.S. PATENT DOCUMENTS

| | | | | |
|---|---|---|---|---|
| 5,142,393 A | * | 8/1992 | Okumura et al. | 349/121 |
| 5,325,218 A | | 6/1994 | Willett et al. | 359/53 |
| 6,191,836 B1 | * | 2/2001 | Woo et al. | 349/124 |
| 6,320,629 B1 | * | 11/2001 | Hatano et al. | 349/15 |
| 2004/0080693 A1 | * | 4/2004 | Kuruhara et al. | |

FOREIGN PATENT DOCUMENTS

| | | | | |
|---|---|---|---|---|
| EP | 0604903 A2 | | 7/1994 | ......... G02F/1/1335 |
| EP | 1072931 A2 | | 1/2001 | ......... G02F/1/1339 |
| EP | 1146379 A1 | | 10/2001 | ......... G02B/27/28 |
| JP | 08-029618 | * | 2/1996 | |

OTHER PUBLICATIONS

Valliath et al: "Design of hologram for brightness enhancement in color LCDs" 1998 SID International Symposium Digest Of Technical Papers. vol. 29, May 17, 1998, pp. 1139–1143.

* cited by examiner

Primary Examiner—Robert H. Kim
Assistant Examiner—Thoi V. Duong

(57) ABSTRACT

An external electronically controlled illumination module utilizing polarizing beam splitters to split the light beam I from a projection lamp into two polarization states, selectively altering the state of each polarized light beam to reject a controlled portion of the light where the selectively altered beams are recombined and passed to the projection system optics.

6 Claims, 5 Drawing Sheets

HIGH CONTRAST FAST LIQUID CRYSTAL DISPLAY SYSTEM

TECHNICAL FIELD

The present invention relates generally to liquid crystal display (LCD) systems and, more particularly, to improvements in contrast of LC light valves operating in fast modes, including the ECB mode.

BACKGROUND TECHNOLOGY

A high performance, single panel LC projector preferably employs extremely fast-responding LC light valves for several reasons. For example, the high frame necessary to suppress color sequential artifacts requires such fast response. Another reason is color fidelity; a slow responding light valve mixes colors, degrading color purity. However, the faster responding light valves do not provide the required degree of contrast. In fact, the mode with the fastest response, known as the ECB mode, represents a worst case in that the polarization of the incident light is at 45° with respect to the LC boundary director (i.e., the optical axis direction of the LC boundary layer), resulting in maximum loss of contrast. Consequently, slower operational modes are presently being used in such applications.

The present invention is directed to overcoming one or more of the problems or disadvantages associated with the relevant technology.

SUMMARY OF THE INVENTION

The invention is based upon the contrast of the ECB, and other modes wherein the polarization of incident light is not parallel or perpendicular to the LC director on the light-incident side, being limited by light reflected at the light incident surface of the light valve. A thin layer of birefringent LC material is formed at the interface of the LC material and the glass substrate when the cell is biased. This boundary layer causes a small reflection of the incident light. The reflected light does not have the same polarization direction as the incident light. Moreover, as a direct result of this reflection, the polarization direction of the transmitted light also changes. Both effects contribute to a loss of contrast.

Two embodiments of display systems wherein the detrimental reflections are reduced, eliminated or rendered harmless are disclosed. In the first embodiment, an intermediate layer of LC polymer with a particular director profile is interposed between the LC material and the glass substrate on the light incident side. Thus, when the cell is biased, the intermediate layer is between the glass substrate and the LC boundary layer. In the second embodiment, a hybrid aligned LC layer is provided between the glass substrate layers on the top (light incident side) and bottom. This LC layer is provided with a high pretilt, e.g., between about 45° and 90°, on the side adjoining the top substrate, and a low pretilt, e.g., less than 10°, on the side adjoining the bottom substrate. In either case, polarization of the reflections at the light incident side of the cell is not affected in such a way that contrast is reduced.

BEST MODE FOR CARRYING OUT THE INVENTION

Figure 1A:
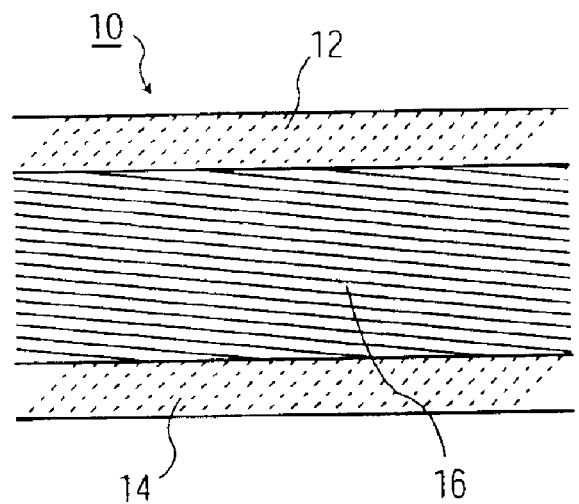
FIGS. 1a and 1b are diagrammatic illustrations of a prior art ECB cell in unbiased and biased conditions, respectively.
Figure 1B:
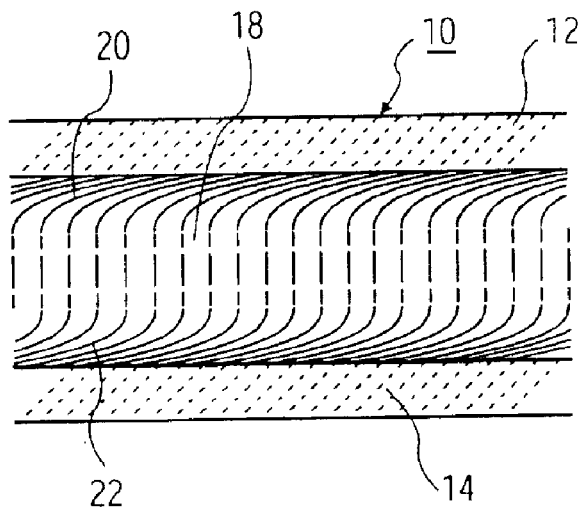

A cross section of a typical ECB cell 10, comprising upper and lower glass substrates 12 and 14, respectively, and LC bulk material 16 is shown in FIG. 1a in its natural, unbiased or "bright" state, and in FIG. 1b under high bias condition. The lines representing the LC material indicate the orientation of the LC molecules. It will be noted that, in the biased state, the LC material is divided into a central layer 18, wherein the molecules are oriented vertically, and upper and lower boundary layers 20 and 22, respectively, at the junctions of the LC material and the substrates.

Figure 2A:
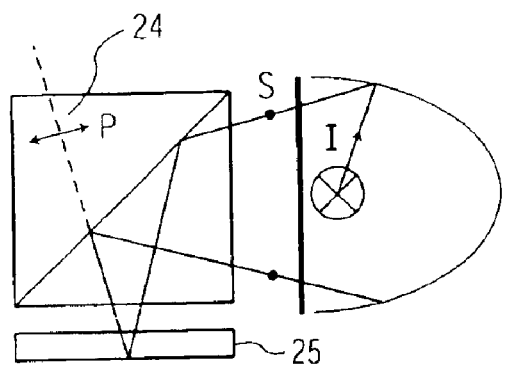
FIGS. 2a through 2d are diagrammatic illustrations of operational characteristics of the cell of FIGS. 1a and 1b.
Figure 2B:
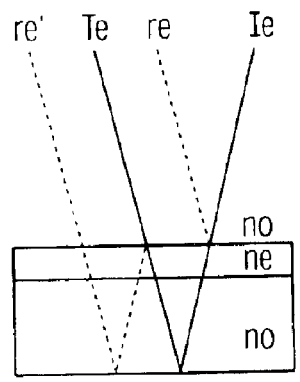
Figure 2C:
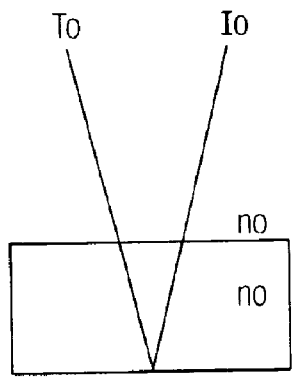
Figure 2D:
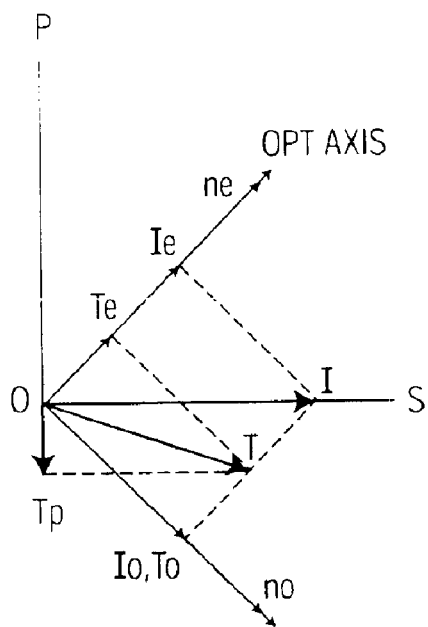

In a ECB light valve application, as illustrated in FIG. 2a, incident light I is polarized along axis S, at 45° to the optical axis of the LC cell 25. In the unbiased "bright" state, the cell acts as a quarter wave plate and causes a 90° rotation of the polarization (from S to P) of the reflected light which is passed to the screen by the polarizing cube 24. Conversely, in a high field, the bulk of the LC, layer 18, is oriented vertically and appears isotropic to the incoming light, i.e., it does not affect polarization. The thin boundary layers 20 and 22, on the other hand, are birefringent and must be compensated by a birefringent film (not shown). As the net birefringence of a well-compensated cell is close to zero, one would expect a very good dark state and, hence, a high contrast. However, it has been found that even with the best compensation efforts, prior art ECB cells exhibited a contrast substantially below that of TN cells. Critical analysis showed that the excess light leakage originates in the upper boundary layer. This intermediate anisotropic layer causes a different reflectivity for light polarized in the extra ordinary (FIG. 2b) and the ordinary direction (FIG. 2c). Two reflections, re and re', represented by dotted lines in FIG. 2b, occur at the boundary layer, reducing the amplitude of the transmitted wave Te at each passage. The result is reduced amplitude Te and, hence, a change in orientation of the exiting transmitted wave T, which now has a component Tp orthogonal to the polarization direction of the incident wave. Reflected waves re and re' (FIG. 2b) also have strong components orthogonal to the input polarization and, therefore, add to the light leakage in the dark state of the system, illustrated in FIG. 2a.

Figure 3:
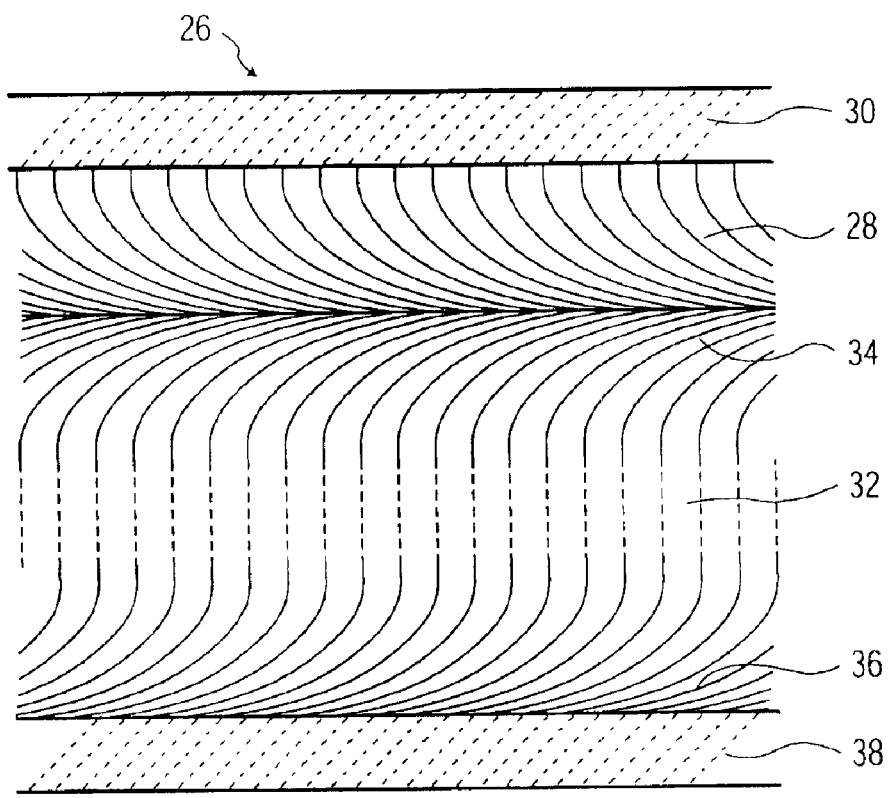
FIG. 3 is a diagrammatic illustration of an LC cell incorporating a first embodiment of the present invention.
Figure 4:
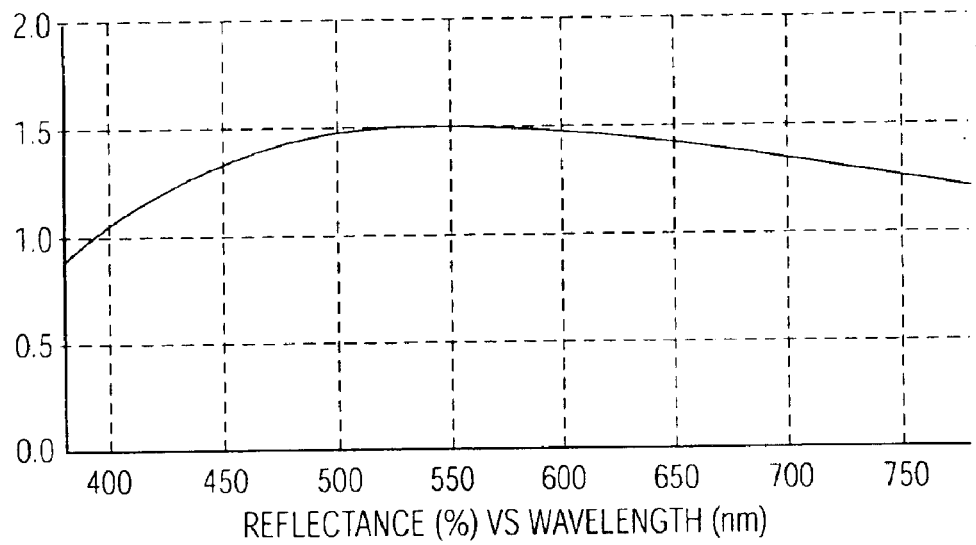
FIGS. 4 and 5 are graphical representations of reflectance vs. wavelength in a practical example of ECB cells of the prior art and of the FIG. 3 embodiments, respectively.
Figure 5:
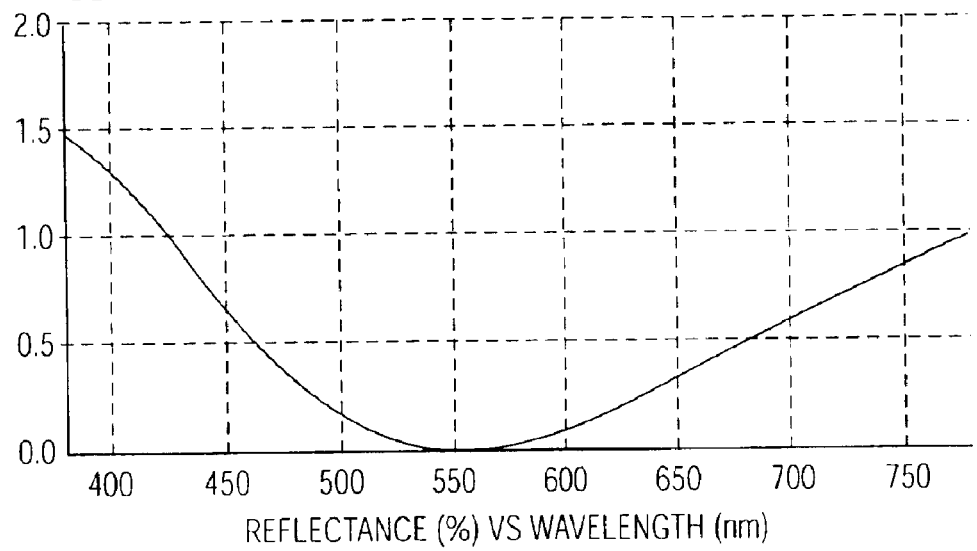
Figure 6:
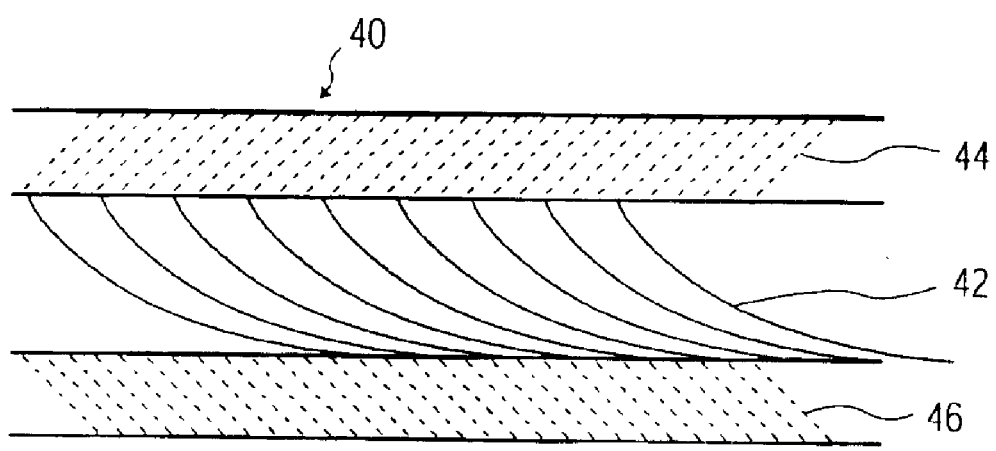
FIG. 6 is a diagrammatic illustration of an LC cell incorporating a second embodiment of the present invention.

Two embodiments of LC cells, which operate with the desired fast response without concomitant reduction of contrast, are illustrated in FIGS. 3 and 6. In cell 26 of FIG. 3, there is illustrated a modified ECB cell in a high field state. Interposing an intermediate, optically anisotropic layer 28 (LC polymer), with a particular director profile, between the upper glass substrate 30 and the LC material 28, shown under bias in bulk layer 32 between boundary layers 34 and 36, reduces reflections due to gradual transition of refractive index from glass 30 to boundary layer 34 to bulk 32. This anisotropic layer can either be a photo polymer or layers that have been evaporated obliquely, layers that have been etched or milled by an oblique particle beam, such as Argon ions. Further, the effective thickness of the combined layers, i.e. boundary layer and intermediate layer, can be tuned to one half of a wavelength, e.g. green, such that reflection vanishes at the wavelength. In a practical case, the LC indices are no=1.5, ne=1.7 and the boundary layer thickness is 70–100 nm, leading to a strong reflection of 1 %–1.5% (FIG. 4). By adding an intermediate layer with the same indices, for a total thickness of 160 nm, reflectivity is reduced, as show in FIG. 5. Thus, intermediate layer 28 adjoins substrate 30 and LC boundary layer 34, while LC boundary layer 36 adjoins lower substrate 38. Thickness and anisotropy, i.e., ordinary (no) and extraordinary (ne) indexes, of intermediate layer 28 provide sufficient degrees of freedom that the combination of intermediate layer 28 and LC boundary layer 32 form a net isotropic stack. An example of a suitable material for intermediate layer 28 is a LC (photo) polymer. The orientation profile of the LC director inside this intermediate layer can be manipulated in a number of well-known ways. For example, the orientation can be perpendicular to the substrate at the light incident side and gradually transition to parallel at the light exiting side.

A second means for reducing or eliminating surface reflections is modification of the alignment of LC to molecules within cell 40, as shown in FIG. 6. A very steep tilt angle (e.g., between about 45° and 90°) of LC layer 42 relative to top substrate 44 is established at the light incident side, while the angle is almost parallel (e.g., 0° to 10°) at the juncture of layer 42 and lower substrate 46. In the 90° case, the LC boundary layer adjoining upper substrate 44 is optically isotropic, whereas at decreasing angles the anisotropy increases. In the latter case, a desired compromise between speed and contrast can be achieved.

FUNCTIONAL DESCRIPTION

Critical analysis showed that the excess light leakage originates in upper boundary layer 20. This anisotropic layer causes a different reflectivity for light polarized in the extraordinary and ordinary directions, illustrated in FIGS. 2b and 2c, respectively. Two reflections, re and re', represented by dotted lines in FIG. 2b, occur at the boundary layer, reducing the amplitude of the transmitted wave Te at each passage. The result is reduced amplitude Te and, hence, a change in orientation of the exiting Transmitted wave T, which now has a component Tp orthogonal to the polarization direction of the incident wave. Reflected waves re and re', also have strong components orthogonal to the input polarization and, therefore, add to causing light leakage in the dark state of the system.

Interposing intermediate layer 28, an LC polymer with a particular director profile, between the LC material and top substrate 30, as shown in FIG. 3, reduces reflections due to gradual transition of refractive index from glass to boundary layer to bulk. Such a structure represents the equivalent of an anisotropic graded index layer which can serve as an antireflection layer for the underlying (also anisotropic) LC boundary layer. Further, the effective thickness of the combined layers, i.e., boundary layer 34 and intermediate layer 28, can be tuned to one-half of a chosen wavelength, e.g. green, such that reflection is totally eliminated at that wavelength.

A comparison of reflectance in the biased prior art cell 10 (FIG. 1b) and in cell 26 over a range of wavelengths is graphically shown in FIGS. 4 and 5, respectively. In the illustrated example, the LC indices are: no=1.5, ne=1.7 and the boundary layer thickness is 70–100 nm. In uncompensated cell 10 reflectance is in the range of 1 %–1.5% throughout the spectrum of interest (FIG. 4). Reflectance in the case of cell 26, using a parallel-aligned LC polymer, (FIG. 5) shows a great improvement, i.e., is much diminished. Similar results may be obtained with cell 36 of FIG. 6, employing hybrid aligned LC layer 42 with high pretilt on the light incident side of top substrate 44 and low pretilt on the side adjoining bottom substrate 46.

Other aspects and features of the present invention can be obtained from a study of the drawings, the disclosure, and the appended claims.

What is claimed is:

1. An LCD system capable of fast mode operation with high contrast, said system comprising:

a) a source of polarized lights;

b) an electrically controlled birefringence LC cell having a surface upon which said light is incident, wherein said cell includes LC bulk material contained between and adjoining an upper and a lower glass substrate, said upper substrate having said surface;

an optically anisotropic intermediate layer interposed between said upper substrate and said LC material;

wherein said cell includes LC bulk material contained between an upper and a lower glass substrate and adjoining said lower glass substrate;

wherein said intermediate layer is oriented in the same plane as said LC bulk material when in an unbiased state;

wherein an ordinary index of refraction and an extraordinary index of refraction of said intermediate layer are the same as an ordinary index of refraction and an extraordinary index of refraction of said bulk LC material;

such that a boundary layer of said LC bulk material adjacent to said intermediate layer in combination with said intermediate layer forms a net isotropic stack.

2. The system of claim 1 wherein said intermediate optically anisotropic layer is an LC polymer having a predetermined director profile.

3. The system of claim 1 wherein said optically anisotropic intermediate layer comprises a photo polymer.

4. The system of claim 1 wherein said optically anisotropic intermediate layer is evaporated obliquely between said upper and lower glass substrates.

5. The system of claim 1 wherein said optically anisotropic intermediate layer is etched by an oblique particle beam.

6. The system of claim 1 wherein said optically anisotropic intermediate layer is milled.

* * * * *